(12) United States Patent
Trudeau et al.

(10) Patent No.: US 7,887,065 B2
(45) Date of Patent: Feb. 15, 2011

(54) HEIGHT CONTROL VALVE FOR VEHICLE LEVELING SYSTEM

(75) Inventors: Curtis A. Trudeau, Caledonia, MI (US); Mark W. Pierce, Wyoming, MI (US)

(73) Assignee: Hadley Products, Grandville, MI (US)

( * ) Notice: Subject to any disclaimer, the term of this patent is extended or adjusted under 35 U.S.C. 154(b) by 226 days.

(21) Appl. No.: 12/391,471

(22) Filed: Feb. 24, 2009

(65) Prior Publication Data
US 2010/0213397 A1 Aug. 26, 2010

(51) Int. Cl.
*B60G 17/04* (2006.01)
(52) U.S. Cl. .................................. 280/5.514
(58) Field of Classification Search ............... 280/5.5, 280/5.502, 5.506, 5.508, 5.514, 5.515, 5.516, 280/124.157, 124.16, 124.161
See application file for complete search history.

(56) References Cited

U.S. PATENT DOCUMENTS

| | | | | |
|---|---|---|---|---|
| 4,634,142 | A * | 1/1987 | Woods et al. | 280/5.503 |
| 5,058,017 | A | 10/1991 | Adachi et al. | |
| 5,161,579 | A | 11/1992 | Anderson, Jr. | |
| 5,220,982 | A | 6/1993 | Anderson, Jr. | |
| 5,475,291 | A | 12/1995 | Yoshida et al. | |
| 5,560,591 | A * | 10/1996 | Trudeau et al. | 267/64.16 |
| 5,635,809 | A | 6/1997 | Ganser et al. | |
| 5,682,922 | A * | 11/1997 | Galazin et al. | 137/627.5 |
| 5,684,698 | A | 11/1997 | Fujii et al. | |
| 5,787,915 | A | 8/1998 | Byers et al. | |
| 5,860,450 | A * | 1/1999 | Trudeau et al. | 137/627.5 |
| 6,089,551 | A * | 7/2000 | Haviland et al. | 267/64.16 |
| 6,208,497 | B1 | 3/2001 | Seale et al. | |
| 6,382,566 | B1 | 5/2002 | Ferrel et al. | |
| 6,412,790 | B2 * | 7/2002 | McKenzie et al. | 280/6.159 |
| 6,459,225 | B1 | 10/2002 | Maruyama | |
| 6,669,217 | B2 | 12/2003 | Sorum et al. | |
| 6,713,983 | B2 | 3/2004 | Maruyama | |
| 6,832,143 | B2 | 12/2004 | Trudeau et al. | |
| 6,857,646 | B2 | 2/2005 | Sorum et al. | |

(Continued)

FOREIGN PATENT DOCUMENTS

EP 1876423 1/2008

OTHER PUBLICATIONS

Baker, A, Lotus Active Suspension, Automotive Engineer, Feb.-Mar. 1984, pp. 56-57, vol. 9, Issue 1.

*Primary Examiner*—Faye M. Fleming
(74) *Attorney, Agent, or Firm*—Warner Norcross & Judd LLP

(57) ABSTRACT

A height control valve for a suspension leveling system includes a control unit and a valve assembly. The control unit can include a servo powered by a servo current, the servo being coupled to the valve assembly with a linkage. The control unit also can include a controller in communication with the servo and adapted to sense a change in the servo current when the linkage fully engages the valve assembly to reconfigure the valve assembly to a desired supply, exhaust and/or closed position. Based on the change in servo current, the controller can determine a selected distance to move or reconfigure the valve assembly, with distance being independent of any wear or tolerance in the linkage or elsewhere. The control unit can also include an actuator, the movement of which is sensed by a non-contact sensor that is in communication with the controller.

24 Claims, 12 Drawing Sheets

U.S. PATENT DOCUMENTS

| | | |
|---|---|---|
| 6,861,814 B2 | 3/2005 | Hayashi |
| 6,918,600 B2 | 7/2005 | Dodd et al. |
| 7,028,996 B2 * | 4/2006 | Plath .................. 267/64.17 |
| 7,126,458 B2 | 10/2006 | Trudeau et al. |
| 7,192,032 B2 | 3/2007 | Dodd et al. |
| 7,192,033 B2 * | 3/2007 | Bolt et al. ............. 280/5.514 |
| 7,204,478 B2 * | 4/2007 | Plath .................. 267/64.28 |
| 7,215,115 B2 | 5/2007 | Saito et al. |
| 7,261,304 B2 | 8/2007 | Trudeau et al. |
| 2002/0101213 A1 | 8/2002 | Maruyama |
| 2005/0279867 A1 | 12/2005 | Ismailov |
| 2006/0171091 A1 | 8/2006 | Seale et al. |

* cited by examiner

US 7,887,065 B2

HEIGHT CONTROL VALVE FOR VEHICLE LEVELING SYSTEM

BACKGROUND OF THE INVENTION

The present invention relates to a leveling system for a vehicle, and more particularly to a height control valve for use with such a leveling system.

Many vehicles include leveling systems that automatically adjust the suspension of the vehicle to compensate for various loads. These systems are installed in various vehicles, ranging from passenger cars to semi-trucks and semi-trailers. A conventional leveling system includes pneumatic suspension elements, such as shocks or air springs, that can be inflated or deflated to control the height of the frame with respect to the axle. For example, with semi-trailers, heavy loads can cause the suspension to sag, thereby decreasing the distance between the frame and the axle. Further, if the load is not evenly distributed throughout the trailer, the load may also alter the attitude of the trailer, for example, the fore-aft tilt and/or side-to-side tilt. These conditions can adversely affect the handling of the trailer, and can even result in damage to the suspension, frame and axle. With conventional leveling systems, this problem is addressed by inflating the pneumatic suspension to compensate for the load. Specifically, when the attitude of the trailer has been affected by an uneven load, the various suspension elements can be inflated or deflated independently to return the trailer to the desired attitude.

In many leveling systems, the height of the suspension is automatically controlled by mechanical height control valves. Mechanical height control valves usually are located between a source of compressed air and the suspension elements. When the distance between the axle and frame falls below the desired position, the height control valve automatically causes inflation of the suspension, and when the distance between the axle and the frame is too great, the height control valve automatically causes the suspension to exhaust.

An example of a mechanical height control valve is shown in U.S. Pat. No. 5,860,450 to Trudeau. Conventional mechanical height controls such as this include a valve body and a control arm. The valve body usually is mounted directly to a vehicle frame and houses a valve assembly which controls the flow of air through the valve to the suspension elements. The control arm extends from the valve body to the axle and is mechanically connected to the valve assembly within the valve body by an actuator mechanism. The control arm is capable of moving the valve between different positions mechanically via a purely mechanical connection. When the orientation of the axle relative to the frame changes, the control arm moves, thus mechanically reconfiguring the valve body, which in turn inflates or deflates the appropriate air spring to level the vehicle.

Although such conventional mechanical height control valves operate relatively well, there is room for improvement with their operation. For example, the mechanical connection between the control arm and the valve assembly of a mechanical height control valve wears over time. With this wear, the sensitivity and exact positioning of the valve, and thus the precise inflation or deflation of the suspension, is compromised. In addition, the tolerances between the control arm and the valve assembly can deteriorate with such wear, or simply from improper adjustment. Accordingly, the valve assembly may not move as far as it did when it was new or first configured. In turn, the mechanical ride height control valve may not timely inflate or deflate enough air from the suspension. Alternatively, the mechanical connection between the actuator and the valve assembly may become so worn that it cannot properly control the valve assembly, and therefore the height leveling ability of the height control valve becomes significantly diminished. As a result, the vehicle is not properly leveled, and this condition can have adverse affects on vehicle stability and fuel consumption.

SUMMARY OF THE INVENTION

The present invention provides a height control valve that precisely and accurately supplies and exhausts the appropriate amount of fluid to one or more suspension elements of a vehicle.

In one embodiment, the height control valve includes a control unit coupled to a valve assembly, the valve assembly including an element, such as a plunger, moveable to multiple positions, for example, a "supply" position in which the assembly permits fluids to inflate the suspension element, an "exhaust" position in which the assembly permits fluids to exhaust from the suspension element, and a "closed" position in which the assembly prevents fluids from entering or exiting the suspension element.

In a different embodiment, the valve assembly is in communication with a control unit. The control unit can include an actuator that is joined with one member of the vehicle, such as an axle. The actuator can be responsive to a change in distance or orientation between the member and another member, for example, a vehicle frame to which the control unit is joined. To "sense" the movement, the actuator can include, or can be in close proximity to one or more non-contact movement sensors, which sense movement of the actuator relative to the control unit or vice versa.

In another embodiment, the actuator can include a first element and a second element, which are in close proximity, but not physically contacting one another, where the first and second elements cooperate to act as a sensor, which senses or determines movement of the actuator relative to the remainder of the control unit, thereby indicating that the members of the vehicle have moved relative to one another. Optionally, one or more of the elements can be a magnetic element which is monitored by a corresponding position sensor capable of measuring movement of the magnetic element.

In yet another embodiment, the control unit can include a controller which is in communication with the sensor. The controller can determine when the sensor senses movement of the actuator, and thus a change in the distance between the vehicle members. As a result, the controller can control the valve assembly to reconfigure it to the supply, closed or exhaust positions as required.

In a further embodiment, the control unit can include a servo controlled by the controller. The servo can be powered by a servo current, which is regulated by the controller. The controller can sense changes in the servo current, and thus "sense" when the servo or its components are physically engaged with and ready to move or reconfigure the valve assembly.

In yet a further embodiment, the control unit can include a linkage joining the servo with the valve assembly to transfer motion from the servo to the valve assembly. Further optionally, the linkage can include a pin moveable within a slot. When the pin engages an end of the slot, or other portion of the slot which impedes movement of the pin, the engagement can cause a change in the servo current. The controller can detect this change in servo current, and subsequently determine a distance to precisely move the plunger within the valve assembly.

The present invention provides a simple and efficient height control valve that precisely and accurately inflates and deflates vehicle suspension elements. The height control valve can consistently actuate a valve assembly, which in turn, modifies the attitude, pitch, roll, or tilt of the vehicle. In turn, the vehicle can obtain significantly improved load stability, as well as surprising and unexpected results of improved fuel economy up to 3% over conventional mechanical ride height control valves. In addition, the present invention is usually unaffected by the physical wear. For example, where the control unit includes a non-contact sensor for determining actuator movement, there are no sensor parts prone to wearing out. Further, even where the linkage between the servo and valve assembly wears, with the controller adapted to sense when the servo engages the valve assembly, such wear has little—if any—adverse effect on the precise positioning of the plunger and thus operation of the valve. In turn, even as parts of the height control valve wear, the performance of the valve remains relatively unaffected.

These and other objects, advantages and features of the invention will be more readily understood and appreciated by reference to the detailed description of the invention and the drawings.

DETAILED DESCRIPTION OF THE PREFERRED EMBODIMENT

I. Overview

Figure 1:
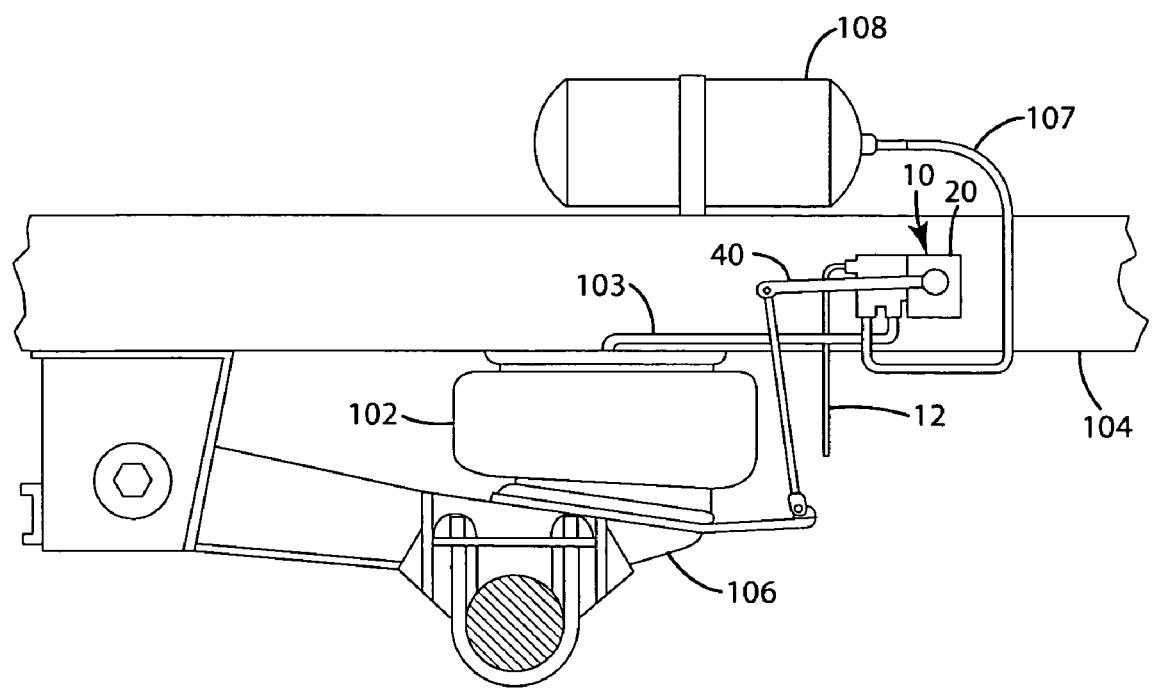
FIG. 1 is a side view of a vehicle suspension equipped with a height control valve of the present invention.

A ride height control valve constructed in accordance with an embodiment of the invention is illustrated in FIGS. 1-9 and generally designated 10. Generally, the height control valve 10 is described in connection with a leveling system where the valve functions to control the flow of air into and out of suspension elements 102, for example, an air spring associated with a vehicle, such as, a semi-tractor, a semi-trailer, a truck, an automobile or a tractor. The height control valve 10 is also well suited for use in a variety of other height control systems, such as a truck cab system that levels the truck cab with respect to a truck frame, controls the truck cab ride height, or controls the truck cab spacing.

The height control valve 10 generally includes a housing 20, a control unit 30 and a valve assembly 50, which act in concert to supply or exhaust fluids from the suspension elements or which remain closed so that the suspension elements maintain a static configuration.

The height control valve 10 is mounted to one or more members of a vehicle in a conventional manner with the housing 20 secured to the vehicle frame 104 as shown in FIG. 1, and the free end of the control arm 40 joined with another member, such as a moving axle assembly 106. The height control valve 10 can be in communication with virtually any element that moves with the axle or, more generally, the wheels of the vehicle. Optionally, the height control valve 10 can be installed in reverse, with the housing 20 being secured to the axle, or some other related member, and the control arm 40 secured to the frame, or some other member of the vehicle. In certain applications, such as a truck cab height control system, the height control valve 10 can be mounted between any two components for which relative movement is desired to be controlled.

With reference to FIGS. 1-7, movement of the axle assembly 106 relative to the frame 104 causes rotation of the control arm 40 with respect to the height control valve 10. This, in turn, is detected by the controller 70, which operates the servo 90 and subsequently the plunger 52 within the valve assembly 50 to control the flow of air through the height control valve 10. As illustrated in FIG. 1, the height control valve 10 can be in fluid communication with a supply of compressed air 108 via the supply line 107. A suspension line 103 provides fluid communication between the height control valve 10 and the air spring 102. When the valve assembly 50, particularly the plunger 52, is moved by the control unit 30 to a "supply" position (FIG. 7), the height control valve 10 provides fluid communication between supply line 107 and suspension line 103 so that air from the source 108 is supplied to the air spring 102. When the valve assembly 50, particularly the plunger 52, is moved to the "exhaust" position (FIG. 8), air is permitted to exhaust from the air spring 102 through the suspension line 103, the valve assembly 50 and out the exhaust line 12 to the atmosphere. Finally, when the actuator is at the desired set point, such as the central or "closed" position (FIG. 6), the height control valve 10 closes both supply line 107 and suspension line 103, thereby preventing air from entering or exiting the air spring 102.

The control unit 30 can include a controller 70, a servo 90 and a linkage 92 which operably joins the servo 90 and a plunger 52 of the valve assembly 50. The servo is powered by a servo current to move the linkage 92. The servo current can be monitored by the controller 70. The controller 70 can sense when the servo current changes, which can indicate that the linkage is fully engaged with the plunger 52. Thus, the controller 70 can determine the precise movement required of the plunger 52 to achieve a desired configuration of the plunger within the valve assembly and, accordingly, ensure that the servo moves the plunger a distance corresponding to that configuration.

In turn, this eliminates or reduces any effect on movement that might be caused by wear or tolerances in the linkage, servo, or plunger. The control unit 30 can also include non-contact sensor 60 that senses movement of the control arm, also referred to as an actuator, as it moves with the relative movement between the members of the vehicle. The non-contact sensor 60 can be in communication with the controller 70, and provide or receive position signals that indicate the position of the actuator 40. Due to the non-contact structure of the sensor, it can have extremely long wear life and, accordingly, increase the longevity of the height control valve 10.

II. Construction

One exemplary embodiment of a height control valve 10 and its components will now be described in detail with reference to FIGS. 1-7. The height control valve 10 generally includes a valve assembly 50 coupled to a control unit 30, the control unit being generally actuated by an actuator or control arm 40.

In general, the valve assembly 50 includes a valve plunger 52 movable within a bore 54 defined by the valve body 51. The valve body 51 further includes a supply port 53, a suspension port 55 and an exhaust port 57, to enable air to escape from or be provided to the suspension elements by way of operation of the plunger. Several components of the valve body are conventional, and can be understood with further reference to U.S. Pat. Nos. 5,860,450 and 5,560,591 to Trudeau, both of which are incorporated in their entirety by reference herein. The supply port 53 is in fluid communication with the supply line 107 and thus the air source 108, while the suspension port 55 is in fluid communication via the suspension line 103 with the suspension element 102, as shown in FIG. 1. The exhaust port 57 generally includes a poppet valve 59 which is in fluid communication with the exhaust line 12. The poppet valve 59 can be sealed relative to the end of the valve body 51 via optional o-rings. In one embodiment, the poppet valve 59 has an elastomer seal on the top of the head that seals on a lip in the body of the valve 51 and on the face of plunger 52. In this embodiment, when the valve is in the "closed" position (FIG. 6), the poppet valve 59 provides a complete seal that allows no fluid flow into or away from port 55. In one embodiment the valve assembly 50 includes a valve stem 79 that interfaces with the valve body 51 and the poppet valve 59. In alternative embodiments, the valve stem 79 may be integrally formed with either the valve body 51 or the poppet valve 59. In the current embodiment, the poppet valve 59 can be sealed relative to the end of the valve body 51 via optional o-rings 58 that form interfaces between the valve body 51 and the valve stem 79, as well as the valve stem 79 and the poppet valve 59.

Figure 6:
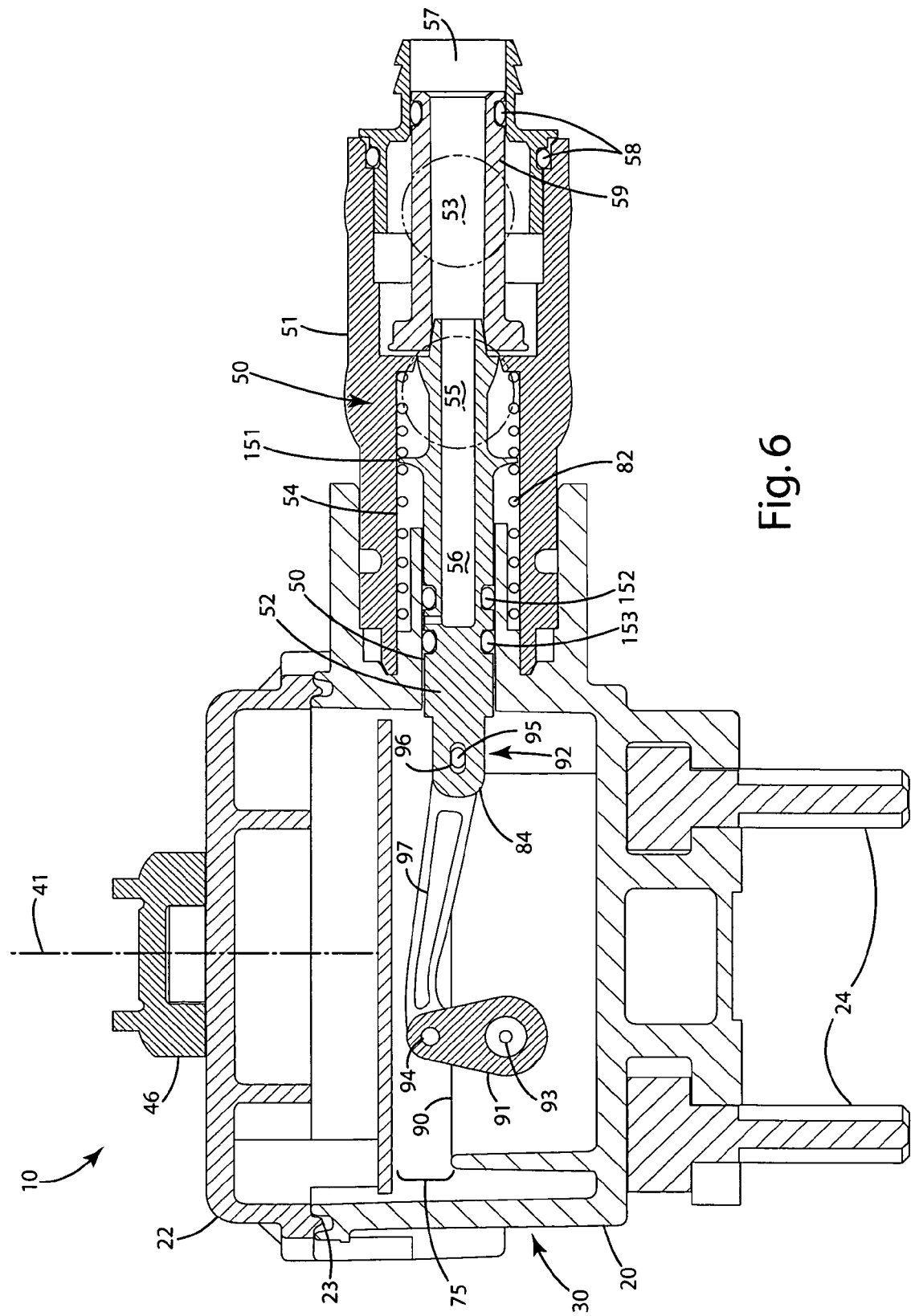
FIG. 6 is a sectional view taken along lines 6-6 of FIG. 2, which illustrates the ride height control valve in a neutral or closed position.

The plunger 52 of the valve assembly 50 is generally located within the bore 54 of the valve body 51. The plunger 52 can include a full diameter portion or flange 151, and can move linearly to control the flow of air through the valve assembly 50. The plunger 52 also can include an internal longitudinal passage 56 which permits air built up between o-rings 152, 153 to flow through the passage, and prevent air from being transferred back to the housing 30. The plunger can define a secondary passage between o-rings 152 so that air between this double seal can be exhausted to the atmosphere rather than leak past the second o-ring 153 into the control unit 30. One or more plunger bias elements, such as plunger spring 82 and exhaust spring 83, can bias the plunger toward a closed or neutral position as shown in FIG. 6. In one embodiment, two plunger bias elements 82, 83 can be configured as a pair of opposing biased coil springs (as shown) that urge the plunger to remain in a neutral position. For example, the opposing biasing elements could be a pair of springs, where one spring biases the plunger in one direction and the other spring biases the plunger in the opposite direction. In the current embodiment, plunger spring 82 is disposed between plunger 52 and the poppet valve 59. The plunger flange 151 may provide a seat for the moving end of the plunger spring 82. The plunger flange 151 may also provide a centering feature to position the plunger close to the centerline of the valve bore 54.

Plunger spring 82 provides a force to seal the interface between the plunger 52 and the poppet valve 59. In the current embodiment, the spring force of the plunger spring 82 biasing the plunger 552 against the poppet valve 59 is approximately 5 pounds. In the current embodiment, exhaust spring 83 is disposed between the poppet valve 59 and the valve body 51. The exhaust spring 83 provides a force to seal the interface between the poppet valve 59 and the valve body 51. The valve stem 79 may provide a seat for the stationary end of the exhaust spring 83. In the current embodiment, the valve stem 79 forms a portion of the valve body 51. As mentioned above, in alternative embodiments, the valve stem 79 may form a portion of the poppet valve 59. In such an embodiment, the moving portion of the poppet valve 59 would be biased against a stationary portion of the poppet valve. In the current embodiment, the spring force of the exhaust spring 83 biasing the poppet valve 59 against the valve body 51 is approximately 10 pounds. The spring force selection of the current embodiment results in a forces of approximately 5 pounds on the poppet valve 59 when the plunger is in a closed or neutral position. Although springs are used in the illustrated embodiment to produce the sealing forces, in alternative embodiments, the forces may be generated using air pressure or other biasing elements.

Optionally, the servo is designed to apply sufficient force to overcome the bias of the bias element(s). Moreover, the servo and bias elements can be configured so that when the servo completes its adjustment of the plunger and powers down, the bias elements will move the plunger back to the closed position without assistance of the servo. That is, with these configurations, the plunger bias 82 can center the plunger 52 so that the servo need not always be operational to center the plunger. Specifically, the bias element can move the plunger to the neutral position in response to a reduction in the servo current, for example, when the servo enters a low power state after completing an adjustment. Accordingly, in the event of a power or structural failure of the servo or other related components, the bias elements can operate as—a back-up, moving the plunger to a neutral or closed position so that the suspension remains in a relatively static state, that is, air is neither exhausted nor filled.

The plunger 52 can include a linkage end 84, which is part of a linkage 92, which operably joins the plunger 52 with the servo 90. The plunger linkage end 84 can define a slot, a recess or a hole 96, which is illustrated as a slot, and which will be described in more detail below.

As shown in FIGS. 1-5, the control valve 10 also can include a control unit 30. The control unit 30 generally includes a housing 20 to which the valve assembly 50 is joined with pins, screws, or other fasteners. These components however may be constructed as a unibody structure as desired. To the housing 20, cover 22 can be attached to protect the internal components of the valve 10. Between the cover 22 and the housing 20, a seal 23 can be disposed. The housing 20 can further be outfitted with bolts, screws or other fasteners 24 to assist in securing the housing 20 to a vehicle member, such as a frame 104 shown in FIG. 1. The housing 20 can be configured to have apertures that correspond to the heads of the fasteners so that those fasteners do not rotate when the corresponding nut is threaded or otherwise joined with the fastener 24.

The control unit 30 can further include an actuator or control arm 40. The actuator 40 is generally of an elongate structure that rotates relative to the housing 20. The actuator 40 can be connected to a member of a vehicle, such as an axle assembly 106 (FIG. 1), and can be responsive to a change in the distance between that member and another member, for example, the frame 104 of the vehicle.

Figure 3:
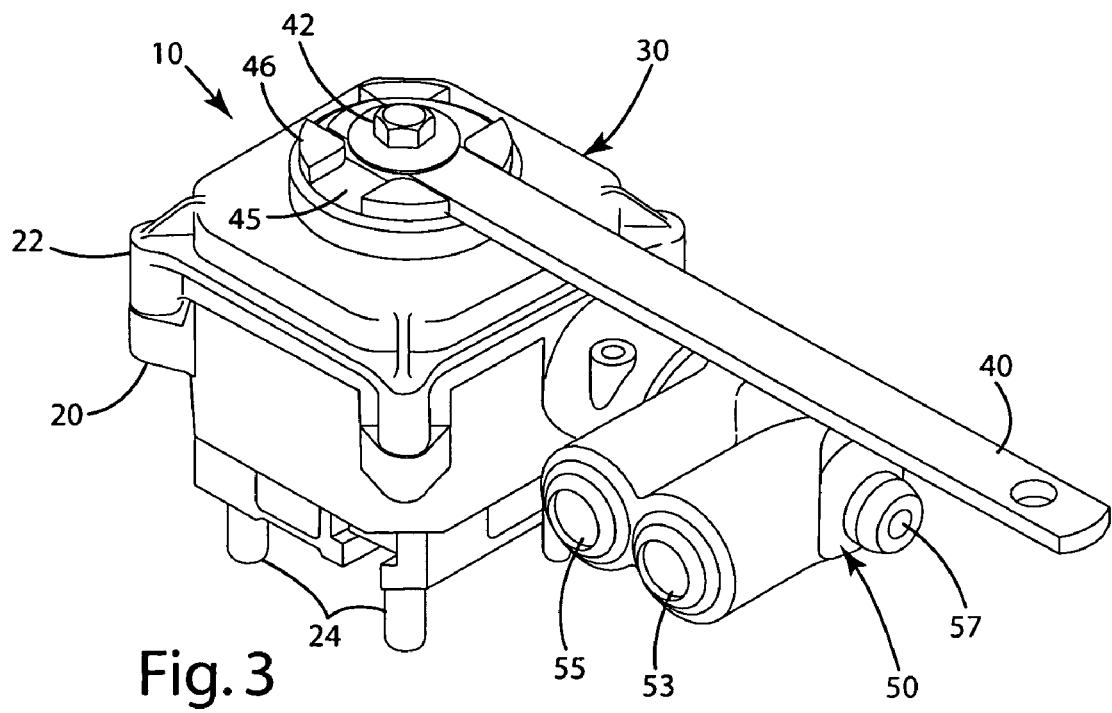
FIG. 3 is a first perspective view of the ride height control valve.
Figure 4:
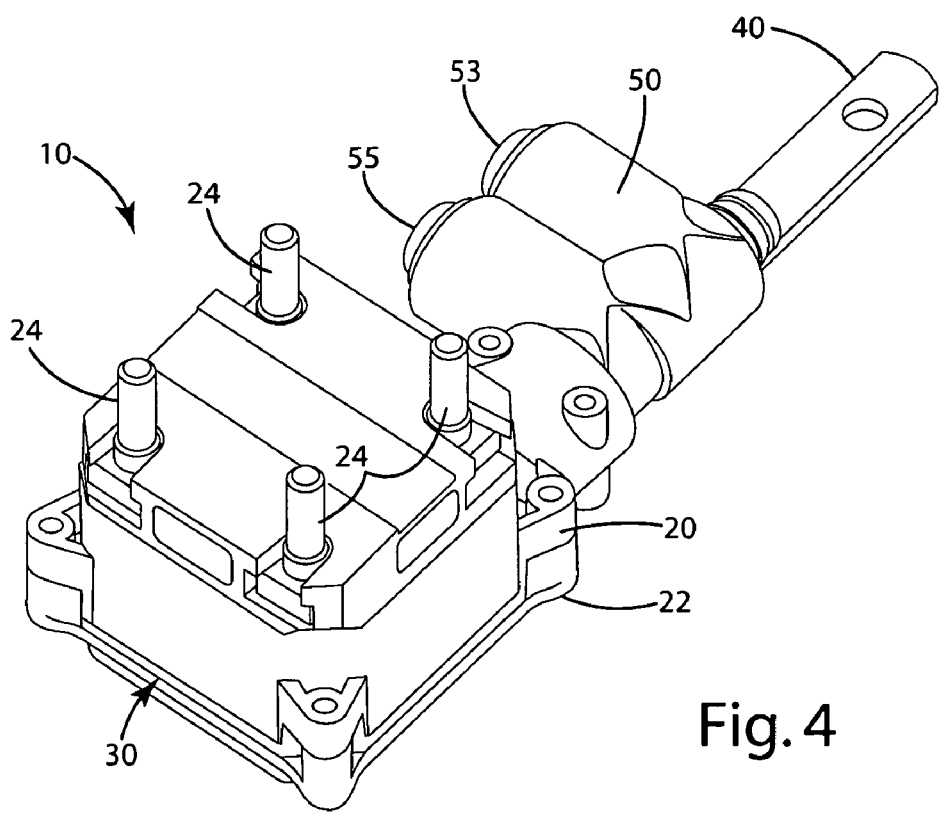
FIG. 4 is a second perspective view of the ride height control valve.
Figure 5:
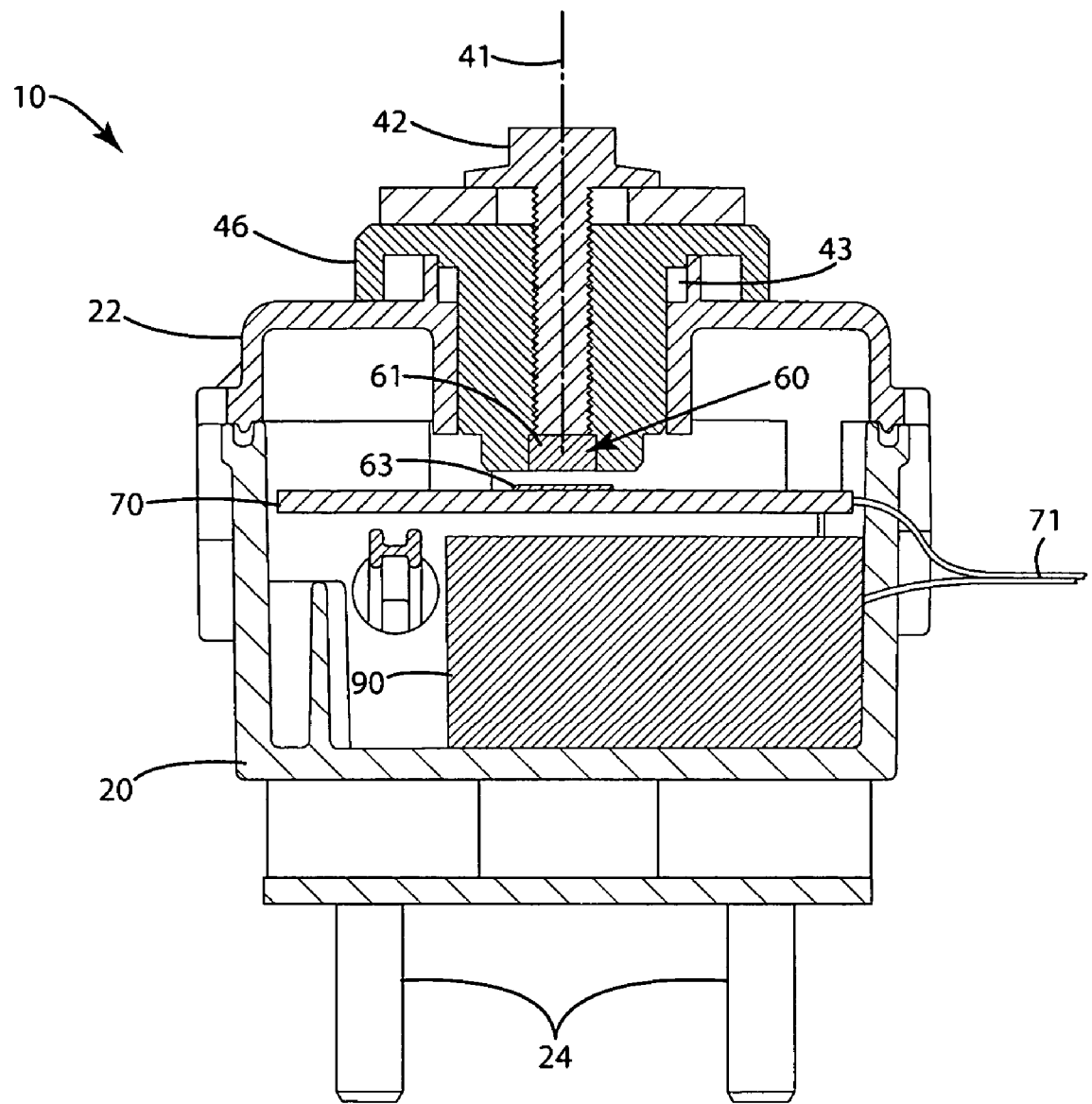
FIG. 5 is a sectional view of the ride height control valve taken along lines 5-5 of FIG. 2.

Referring to FIGS. 3-5, generally, the actuator 40 can be fastened with a screw 42 to a rotor 46. The rotor 46 can be joined with the housing cover 22 and can be adapted to rotate about the actuator axis 41. One or more seals 43 can be positioned between the rotor and the housing and/or screw 42 to provide a sealed environment for the interior of the housing 20.

The exterior portion of the rotor 42 can define slots 45 which accommodate the control arm 40 and hold it in a fixed position relative to the rotor. The slots 45 can be positioned at right angles relative to one another to accommodate a variety of different positions for the control arm 40. To the internal portion of the rotor 46, one or more non-contact sensors or elements 60 can be joined.

The non-contact sensor 60 can include one or more elements that cooperate to generate a position signal directly related to the orientation of the control arm 40 relative to the housing 20, and thus the orientation of the different members of the vehicle relative to one another. In the embodiments shown in FIGS. 2-4, that non-contact position sensor is illustrated as a magnetic position sensor. One suitable magnetic position sensor is commercially available as Model MLX90316 from Melexis of Concord, N.H. The MLX90316 is a CMOS Hall sensor that gives the angular position of a magnetic field parallel to the sensor. The MLX90316 detects the absolute angular position of a magnet that is positioned and rotates near the sensor. In the current embodiment, the magnet is diametrically magnetized and made of rare earth materials. Of course, other suitable magnets and sensors can be used instead.

Such a non-contact sensor 60 optionally can include first and second magnetic elements 61 and 63. Magnetic element 61, for example, can be a magnetized element that gives off a magnetic field, while magnetic element 63 can be a position-sensing chip which is in communication with the controller 70. The position-sensing chip 63 can be adapted to generate a position signal indicative of the change in positional relationship between the first magnetic element 61 and the chip 63, which is directly related to the movement of the actuator 40, and thus the movement between the frame 104 and the axle assembly 106. Of course, the location of the position-sensing chip and the magnetic element can be reversed as desired.

A variety of other non-contact position sensors can be substituted for the aforementioned non-contact magnetic sensor, for example, any infra-red, laser, light-detecting or sonic position sensors that can measure the orientation or movement of one element relative to another can be used as desired.

As mentioned above, the non-contact position sensor 60 is in communication with the controller 70. The controller 70 can include a processor 120 and circuitry coupled to both the position sensor 60 and the servo 90. The controller 70 can further be powered by a power source feed 71 which can be a harness in communication with the electrical system of the vehicle, and optionally, an onboard computer of the vehicle to provide up-to-the-minute leveling information to the operator of the vehicle.

In general, the controller 70 communicates with the sensor to receive a position signal therefrom. The controller 70 determines the appropriate amount of inflation or deflation depending on input from the non-contact position sensor 60, that is, the position sensor signal. Specifically, the controller 70 receives the position signal and determines the relative position of the actuator which, of course, is directly related to the orientation of the vehicle members 104 and 106. The controller 70 further processes this signal to determine the appropriate actuation of the servo 90 based on the position signal. By operating the servo 90, the controller 70 subsequently moves the plunger 52 within the valve assembly 50 to one or more of supply, exhaust and closed/neutral positions as the application requires and as detailed further below.

In relation to the servo, the controller 70 detects the servo current being drawn by the servo to move the components of the servo, for example, the servo horn 91 and subsequently the linkage 92 of the servo 90. The controller 70 can detect a change in the servo current which is caused when the servo begins to undergo additional strain by one of its members, for example, the servo horn 91 being physically impaired from moving. Upon detecting this servo current change, the controller 70 can effectively detect or determine when the servo begins to engage another element, for example, the plunger 52. When the controller 70 determines that the servo current change has reached a threshold value, indicative of the servo being physically engaged with the plunger 52 through the linkage 92. The controller 70 determines the appropriate amount of movement of the plunger by the servo and controls the servo 90 so that it moves the plunger the calculated distance. Accordingly, the plunger moves to the appropriate supply, closed or exhaust positions, or any combination thereof, to ensure that the air spring is inflated or deflated the appropriate amount.

Figure 9:
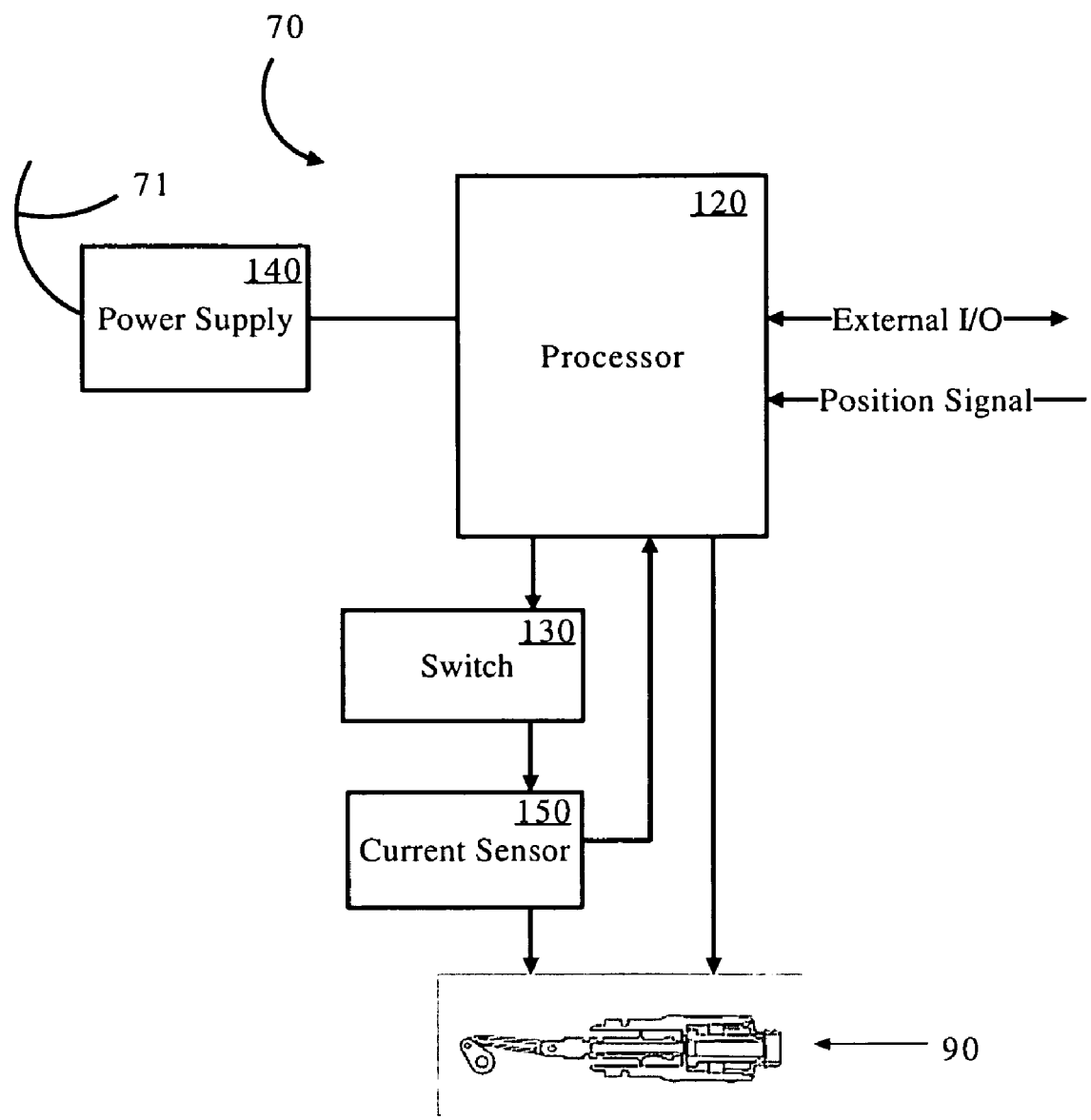
FIG. 9 is a block diagram of one embodiment of the controller of the ride height control valve.

The controller 70 shown in FIG. 9 includes a circuit board having a processor 120, a power supply 140, a switch 130, and a current sensor 150. The controller circuit components of the current embodiment are off the shelf components that a person of ordinary skill in the art would understand how to connect and operate. Of course, in alternative embodiments, custom circuit components that accomplish the desired functionality may replace or supplement the components used in the current embodiment of the controller 70.

The processor 120 can be any processor that can accept sensor data, process the sensor data to determine an appropriate adjustment, and output a servo command to carry out the adjustment. One suitable processor is commercially available as Model PIC18F2580 from Microchip of Chandler, Ariz.

The power supply 140 can be any power supply that provides an appropriate amount of power to the circuit components of the controller 70. One suitable power supply is the voltage regulator commercially available as Model PQ050DNA1ZPH from Sharp of Camas, Wash. The PQ050DNA1ZPH is a low power loss voltage regulator that accepts up to 24 volts and outputs 5 volts. Optionally, the power supply can include other components, for example filters, rectifiers, or safety circuitry.

The optional switch 130 provides an appropriate regulated amount of power to the servo 90. In some embodiments, the switch 130 may provide a fixed voltage during servo operation and provide zero volts while the servo is off. In other embodiments, the switch 130 may provide a variable amount of voltage during servo operation based on input from processor 120. One suitable voltage regulator switch is commercially available as Model BA06SFP from Rohm of Ukyo-ku Kyoto, Japan. In alternative embodiments, the switch 130 may be deleted and the power supply 140 may supply an appropriate amount of power to the servo 90. In another alternative embodiment, the switch functionality may be performed by onboard processor 120.

The current sensor 150 monitors the amount of current being drawn by the servo 90 and provides that information to the processor 120. One suitable current sensor is commercially available as Model ZXCT1009 from Zetex of Chadderton Oldham, United Kingdom.

In general, the servo 90 can be any device that provides control through the use of feedback. The servo 90 of the current embodiment will now be described in detail. The servo 90 includes a motor that accepts position commands and a measurement device that is in a feedback loop with the motor in order to provide position control. The servo accepts a desired position as a control input (derived from the non-contact sensor 60) that is compared to the actual position of the servo (measured by the servo measurement device). Differences between the actual position and the desired position are used to create signals to drive the servo. Of course, the servo may take other factors into consideration in creating the drive signal. For example, where the drive signal does not move the servo closer to the desired position, the servo may draw more current to overcome resistance. In the current embodiment, this occurs regularly where more power is needed to move the servo once it physically engages the plunger than is needed to move the servo when it is not physically engaged with the plunger. One suitable electrically operated servo is commercially available from Futaba Corporation of America of Plymouth, Mich., Model: S-series (S3305).

The servo illustrated in FIGS. 5-6 generally includes a servo horn 91 that rotates about a servo axis 93. The servo is joined with a linkage 92 that moves the valve plunger 52. When energized with a servo current from the power feed 71, the servo moves the linkage, and as noted above, the servo current undergoes a change when the linkage 92 first begins to move the valve plunger 52. The servo current change is caused by the physical reactive force of the plunger 52 counteracting the movement of the servo horn 91 through the linkage 92.

The linkage 92 is joined with the servo horn 91 via a linkage pin 94. The linkage 92 further includes a linkage element 97 which is operably joined with the plunger linkage end 84. As shown, an example of this construction includes the linkage element 97 being a plunger pin 95 journaled in a slot 96 defined by the plunger linkage end 84. The components can be reversed, of course, with the plunger linkage end 84 including a pin and the linkage element defining a slot or hole.

Figure 7:
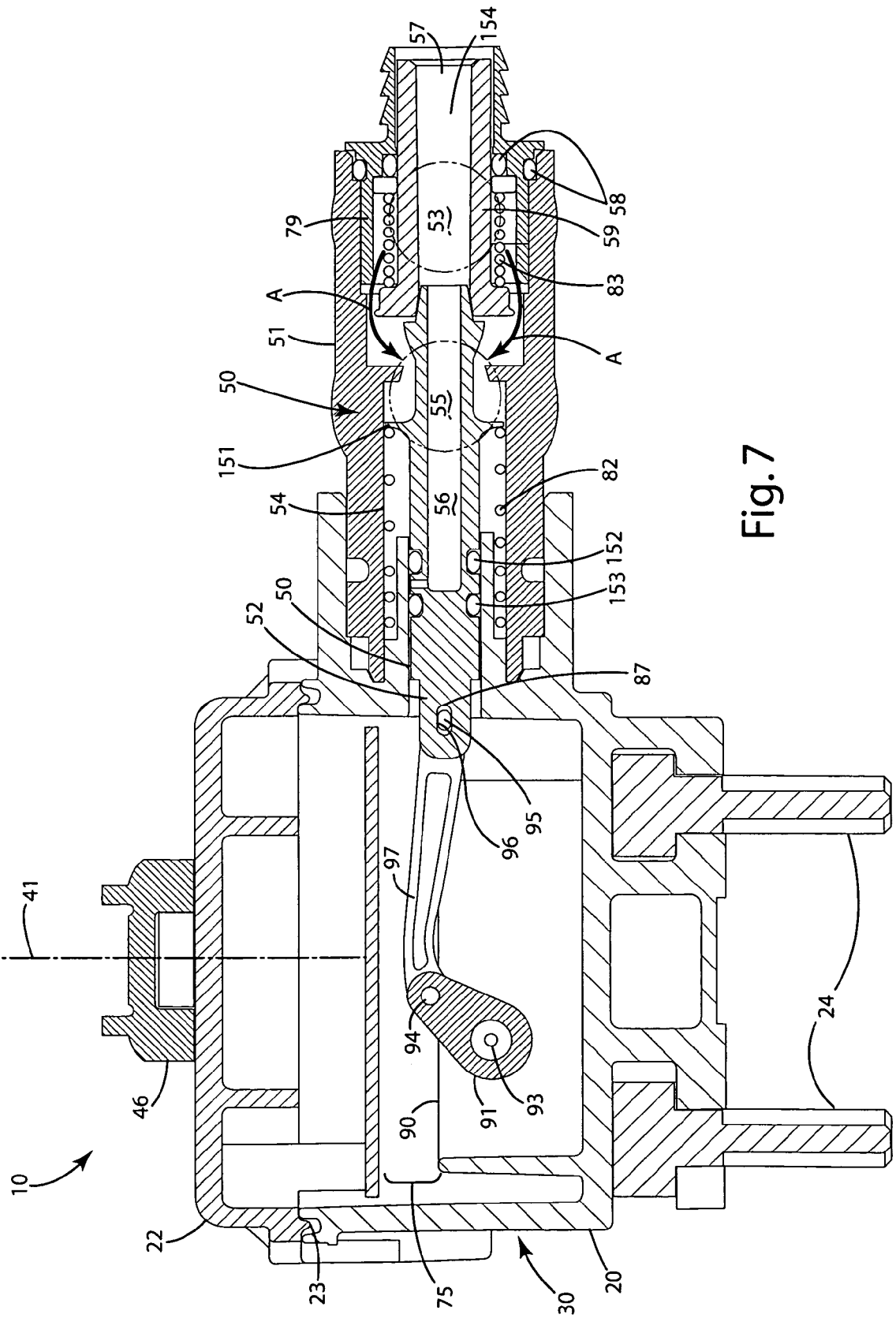
FIG. 7 is a second sectional view of the ride height control valve in FIG. 2 taken along lines 6-6, which shows the ride height valve in a supply position.
Figure 8:
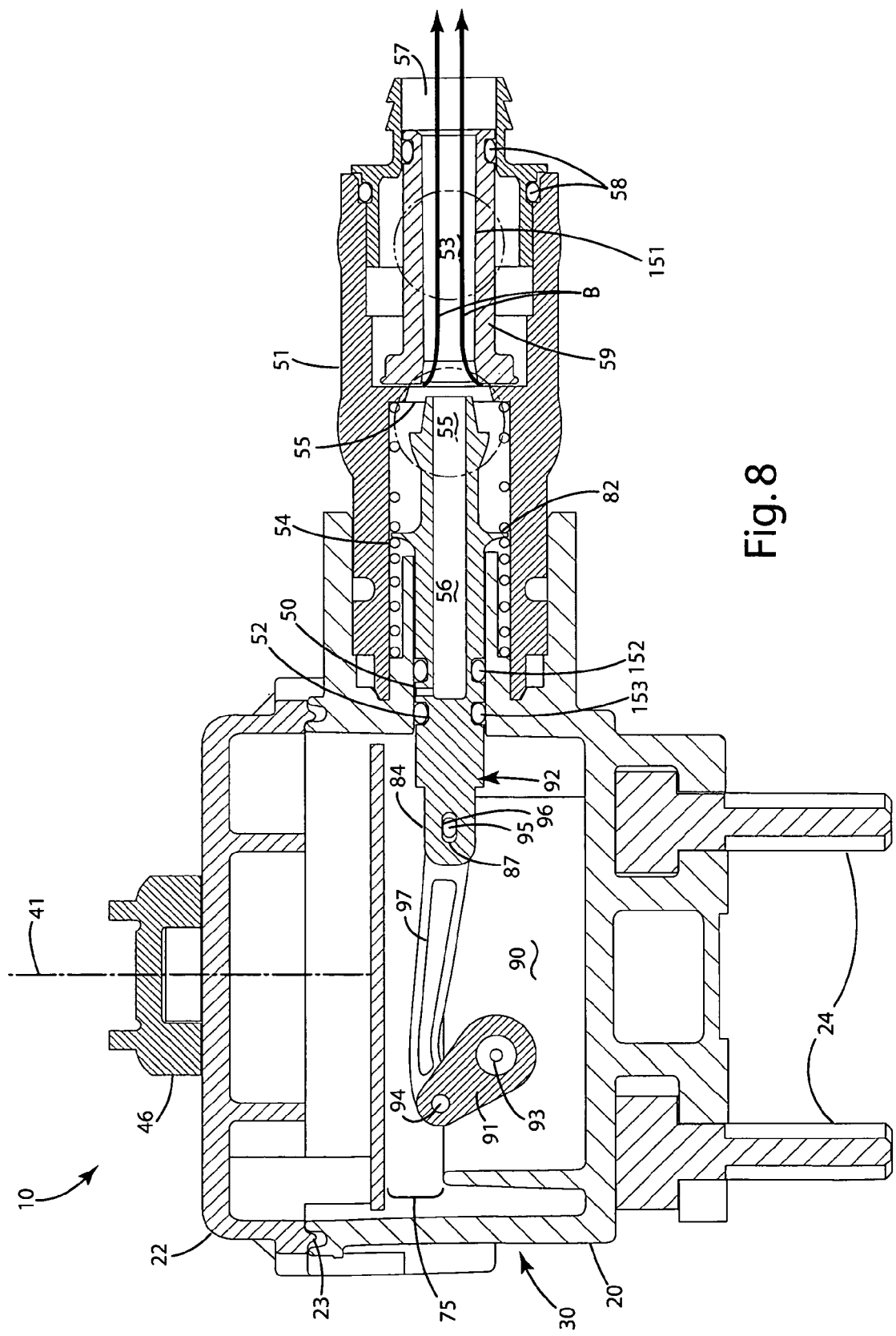
FIG. 8 is a second sectional view of the ride height control valve in FIG. 2 taken along lines 6-6, which shows the ride height valve in an exhaust position.
Figure 13:
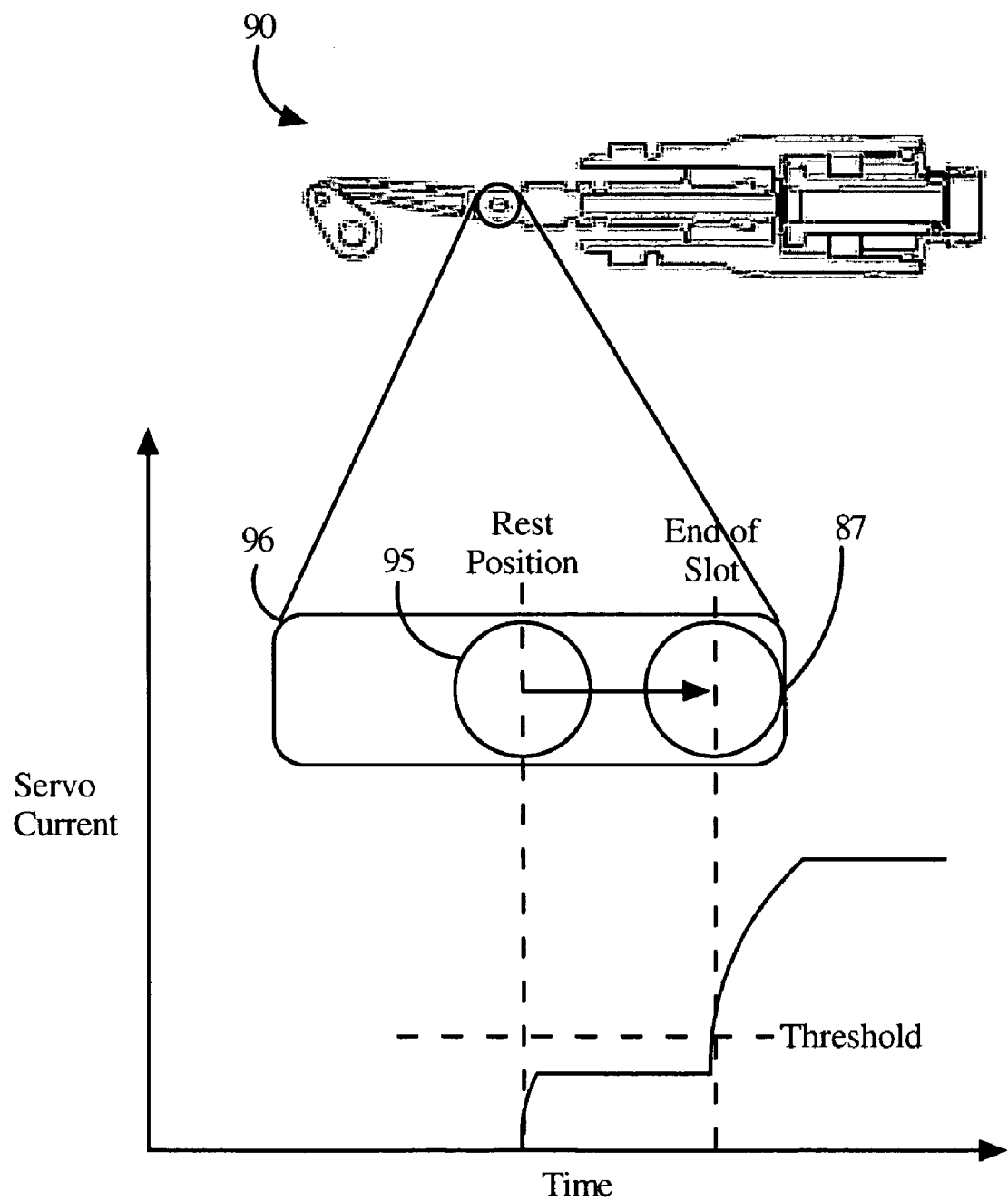
FIG. 13 is a graph showing servo current versus time relative to plunger position in one embodiment.

The slot 96 of the plunger end 84 can include a slot end 87, which the plunger pin 95 engages upon first moving the plunger 52. Incidentally, it is this contact and engagement of the pin 95 with either slot end 87 that causes a physical resistance to movement of the servo, and thus creates a change in the servo current detected by the controller 70. A graph illustrates an optional relationship between the servo current and this engagement is illustrated in FIG. 13, which is described in more detail below. Although shown as a pin and slot configuration, the linkage 92 that joins the servo and the valve plunger can be of a variety of different configurations including, for example, essentially any loosely coupled linkage. Upon engagement of the pin with the slot end, the plunger can be moved to any of the desired neutral, supply, exhaust or closed positions as shown in FIG. 6, 7 or 8, respectively.

III. Manufacture and Assembly

The manufacture and assembly of the height control valve 10 will now be described. The housing 20, cover 22, control arm 40, rotor 46, plunger 52, linkage 92 and other components can be manufactured using conventional injection molding, milling, forming or machining techniques and apparatus.

To assemble the valve assembly 50, the plunger 52 is installed within the valve assembly 50 with the corresponding springs 82, 83 in place. The o-rings 153, 152 are also fitted in sealing engagement with the bore 54 to prevent air from entering the control unit 30. Commercially available thread lock can be applied to the end of the valve assembly 50 when it is inserted into the housing 20 to secure the components together. The valve plunger linkage end 84 can be generally aligned with a corresponding opening in the housing 20 to ensure that it can be coupled to the linkage 92. The poppet valve 59 can be outfitted with an exhaust o-ring 58 and joined with the end of the valve body as shown in FIGS. 3 and 6.

To assemble the control unit 30, the servo motor 90 can be mounted in the housing 20 in a desired configuration so that the linkage 92 is oriented to couple to the plunger linkage end 84. When included, the plunger pin 95 can be journaled in the slot 96 of the plunger linkage end 84. The controller 70 can be installed in the housing 20 as well, and electrically coupled to the servo 90 via wiring 75, and a wiring harness or power source 71. The controller 70 can be in communication with the non-contact sensor 60, for example, the sensor can be wired in a circuit located on the controller 70. Where the non-contact sensor 60 includes magnetic elements, the magnetic element 61 can be aligned with the second magnetic element 63 (which again can detect changes in magnetic field due to rotation or movement of the first element 61).

To further assemble the control unit 30, the rotor 46 can be installed in the cover 22 of the housing 20, being sealed thereto with the appropriate o-rings 43. With the rotor installed, the control arm 40 can be joined with the rotor 46 via the screw 42. With the control valve 10 assembled, it may be installed on a vehicle (FIG. 1) by securing the housing 20 to the frame 104 and the control arm 40 to the axle assembly 106 (or other moving element) using conventional fasteners, and as noted above, the control valve 10 can be installed in reverse as desired. The supply of compressed air 108 can be connected via supply line 107 to the supply port 53. An exhaust line 12 can be joined with the exhaust port 57, and a suspension line 103 can be joined with the suspension port 55 of the valve.

When installed on a vehicle, separate ride height control valves can be supplied for each air spring to permit compensation for fore-to-aft tilting, side-to-side tilting, or pitch and roll conditions. Alternatively, the system can include a separate height control valve for each axle to permit compensation for pitch variations, for-to-aft tilting, or a single height control valve for all suspension elements to permit only vertical adjustment of the frame as desired.

Further optionally, each of the controllers for each control valve can be in communication with one another to cooperatively and efficiently control the suspension elements on the vehicle. These controllers can communicate directly with the vehicle's operating system or onboard computer to provide output in visual or audible form to the driver as the application requires. Alternatively, the controllers of multiple height control valves can be coupled to a single onboard processor of the vehicle, which dynamically monitors the input provided by the position signals provided by the each of the sensors within the different height control valves. Using this data, the single onboard processor can control movement of and operation of all of the valves to subsequently supply air to, or dump air from, the air springs as the application requires.

IV. Operation

Figure 2:
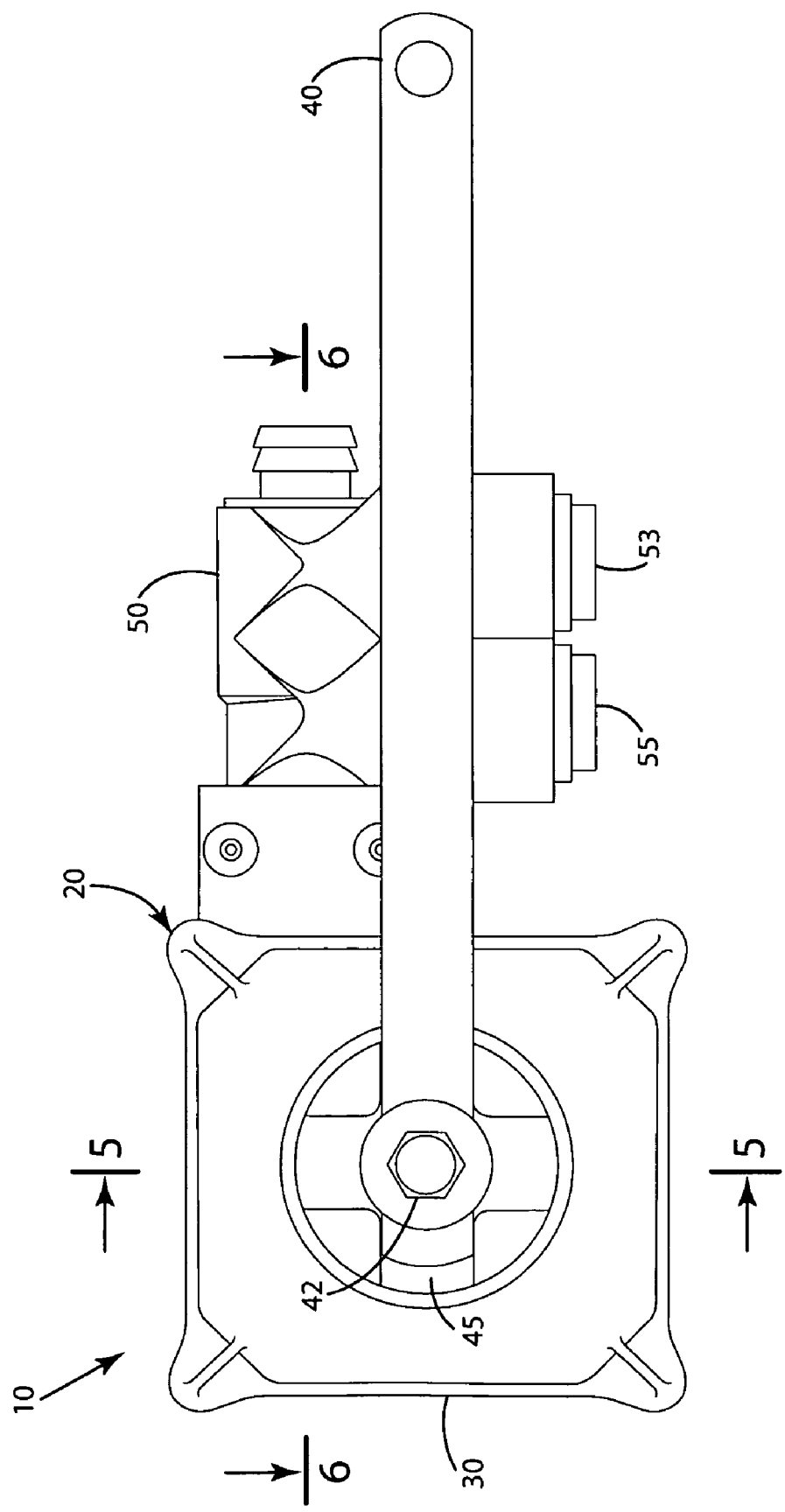
FIG. 2 is a side view of the ride height control valve.

Operation of the height control valve 10 will now be described in reference to FIGS. 6-8 and 10-13. In general, the height control valve 10 is operable between closed (or neutral), supply and exhaust modes, depending on the position of the plunger 52 within the valve body 51. The plunger is in the closed or neutral position in FIG. 6. There, the valve 10 prevents air from entering or exiting the suspension element 102. The valve 10 attains this closed position when the control arm 40 is located in a neutral orientation relative to the valve body 20, usually in a "central" location as shown in FIG. 2. When the control arm 40 is in this location, the non-contact sensor 60 (FIG. 5) relays a position signal to the controller 70, and the controller 70, based on calibrated position sensor signals, determines that the control arm 40 is in a position which requires the plunger to maintain the closed position as shown in FIG. 6.

Movement of the control arm 40 from its central position in FIG. 2 will result in rotation of the magnetic element 61 relative to a magnetic element 63 (FIG. 5) which generates a new position signal that is communicated to the controller 70. The controller 70 then determines the amount of movement needed for the plunger 52 to move from the closed position to either a supply position (FIG. 7) in which air is introduced to the suspension elements from the air supply, or an exhaust position (FIG. 8) in which air is exhausted from the suspension elements. Specifically, when the members 106 and 104 (FIG. 1) move relative to one another, the control arm 40 moves and rotates relative to the housing 20. This rotation alters the positional relationship between the rotor magnetic element 61 and the sensor 63. This, in turn, causes a position signal to be transmitted to and/or received by the controller 70. The controller 70 then processes this information and determines the total amount of movement required of the plunger 52 within the bore 54 to affect a desired movement of air into or out from the suspension element 102.

Before calculating the precise amount of movement, for example, the total distance required to move the plunger 52 to a desired position in the bore, the controller 70 monitors a servo current provided to the servo 90. When the linkage 92 physically engages the plunger 52, for example, the plunger pin 95 engages a slot end 87, a change in servo current is sensed by the controller 70. Based on this change in servo current, the controller 70 is able to determine that any additional movement of the linkage 92 will translate to direct movement of the plunger 52. Perhaps this can best be seen in FIG. 13, which is described in more detail below.

FIG. 13 shows one example of servo current in relation to both time and plunger pin position. In the rest position, the servo is typically in a low power mode where the servo current is zero or near zero because power is generally unnecessary when there is no adjustment to be made. During an adjustment, the servo current is increased to move the plunger pin and ultimately the plunger. In the current embodiment, the servo initializes by moving the plunger pin 95 to the end of slot 87 so that an accurate plunger adjustment can be made. The end of slot 87 is detected when the servo current passes a threshold.

In the current embodiment, the servo current threshold is selected so that it is surpassed when the servo current increases to move the plunger. The amount of servo current can be based on a number of factors. In the current embodiment, when the plunger pin 95 reaches the end of slot 87 and encounters additional resistance from the plunger, the feedback loop increases the servo current in order to keep moving the servo. That is, as explained above, once the plunger pin 95 physically engages the end of slot 87, further movement of the pin translates into movement of the plunger. Thus, the increase in servo current caused by the feedback loop (which will be described in more detail below) allows recognition of the end of slot 87 and thus more accurate plunger movement.

Accordingly, the controller can calculate a selected amount of movement, for example, the distance required to move the plunger 52 within the bore 54 to achieve the desired supply or exhaust position to modify the ride height of the vehicle by inflating or deflating the air spring 102. For example, when moving from the neutral position in FIG. 6 to a supply position in FIG. 7, the plunger pin 95 may move a distance of about 2 mm within the slot 96 before a change in servo current is generated by the plunger pin 95 engaging a slot end 87. The required distance to move the plunger 52 within the bore 54, however, is 22 mm to actuate the valve assembly to a supply position. In conventional systems, the 2 mm would not have been accounted for; and the plunger would simply have been mechanically moved a distance of 22 mm minus 2 mm or about 20 mm. Accordingly, this would not provide the full movement of the plunger, and therefore the full supply of air from supply port 55 to suspension port 53 would not be provided at the full rate. In contrast, the height control valve 10 of the present invention compensates for the 2 mm of tolerance in the physical connection between the servo 90 and the plunger 52, to provide precise movement of the plunger and subsequent precise movement of the plunger to the closed, supply and exhaust positions or any combination of the same. Specifically, using the example where the plunger pin 95 moves before engaging the slot end 87, the controller 70 detects this tolerance by determining when the servo current changes. Accordingly, upon that servo current change, the controller 70 computes that total additional movement is 22 mm for the plunger. Accordingly, the plunger is moved exactly those 22 mm.

The exemplary movement from a neutral position to a supply position is shown in comparing FIGS. 6 and 7. When the valve 10 is in the supply position (FIG. 7), a flow path as indicated by arrows A is opened between the supply port 53 and the suspension port 55 enabling air to be transferred from the air source 108 to the air spring 102 (FIG. 1). The valve 10 moves into this position when the axle moves closer to the frame, which axle movement causes the control arm 40 to pivot in a clockwise direction. This rotation is translated through the non-contact sensor 60 which generates a position signal that is transferred to the controller 70. The controller 70 then provides a servo current, to the servo 90 to initially move the linkage 92 until it first engages the plunger 54. Upon sensing the change in the sensor current caused by the initial engagement, the controller 70 determines the selected distance of movement, and moves the plunger that precise distance to move the valve to the supply position. Air flows through the valve 10 from the supply port 53 to the suspension port 55 shown by arrows A in FIG. 7, and thus from the air source 108 into the suspension element 102. As the suspension element 102 fills, the axle and frame move apart, causing the control arm 40 to pivot, eventually returning the valve 10 to the closed position shown in FIG. 6. Optionally, the controller 70 can detect the position signal and the servo current to efficiently control the servo motor and move the plunger in iterations to finely adjust the air supplied or exhausted from the suspension element.

An exemplary movement from the neutral position to the exhaust position is shown in comparing FIGS. 6 and 8. When the valve 10 is in the exhaust position (FIG. 8), a flow path is opened between the suspension port 55 and the exhaust port 57 to permit air to exhaust from the suspension element 102, through the bore 154 defined by the poppet valve 59. As shown in FIG. 1, the valve 10 moves into the exhaust position of FIG. 8 when the axle assembly 106 moves away from the frame 104 causing the control arm to pivot downwardly and rotate in a counter-clockwise direction. This rotation of the arm rotates the rotor and thus moves the magnetic element 61 relative to the sensor 63 (FIG. 5). This generates the position signal which is detected by the controller 70. The controller 70 determines the selected distance required to move the plunger and begins to actuate the servo with the servo current. As this actuation occurs, the controller 70 monitors the servo current. When the servo current exceeds a threshold value (FIG. 13), the controller 70 detects that the linkage 92 is physically engaged the plunger 52. Upon this engagement, the controller 70 controls the servo 90 to move the plunger the selected distance within the bore to open a flow path B from the suspension element 102 out the exhaust port 57 to the atmosphere. This permits air to flow from the suspension element 102 sequentially through the bore in the exhaust sleeve 59, out the exhaust outlet 57, out the exhaust line 12, and to the atmosphere. As the air spring 102 empties, the axle and frame move closer together causing the control arm 40 to pivot upwardly, eventually returning the valve 10 to the desired position. Optionally, the controller 70 can monitor the position signals from the non-contact sensor 60 caused by movement of the actuator arm, to iteratively recalculate and further control movement of the plunger.

Figure 10:
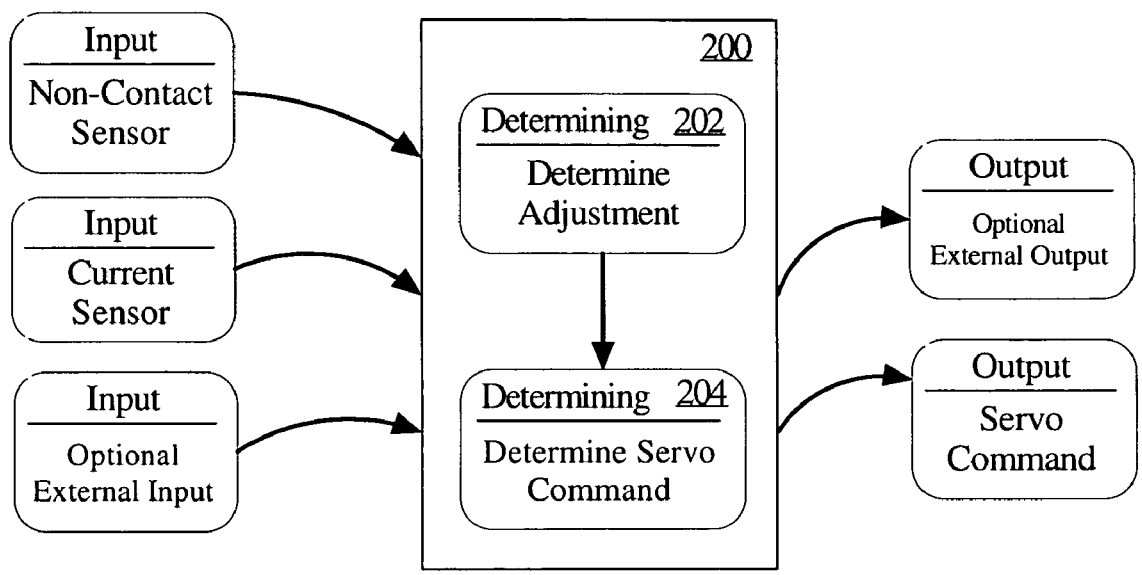
FIG. 10 is a flowchart showing one embodiment of the operation of the ride height control.

With reference to the flow chart of FIG. 10, one embodiment of the process 200 followed by the controller 70 to control movement of the plunger within the valve body to exhaust or supply the appropriate amount of air to or from the air spring 102 is briefly described. In general, the process 200 includes the following steps: determining a ride height adjustment 202 based on the non-contact sensor input and determining a precise servo command 204 to accomplish the adjustment using the current sensor input and the determined ride height adjustment. In some embodiments, the process 200 may take into account other optional external inputs, for example vehicle speed, whether the vehicle is braking, or a number of other number of other factors that could influence the desired position of the plunger. Further, the process 200 may provide additional output, for example diagnostics or status information.

Figure 11:
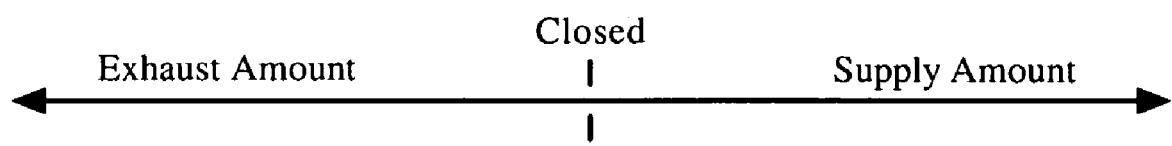
FIG. 11 is a representative diagram showing a range of adjustments.

With reference to the representative diagram of FIG. 11, one embodiment of the process for determining a ride height adjustment is briefly described. Determining a ride height adjustment from the relative position of the axle and frame known and therefore will not be described in detail. Suffice it to say, in general, the greater the distance (or angle) between the axle and frame the greater the supply or exhaust adjustment will need to be. In the current embodiment, the ride height adjustment is a value that indicates how much supply or exhaust is desired. A value below "zero" or some other value is indicative of a desired exhaust rate or exhaust amount, and a value above zero, or some other value is indicative of a desired supply rate or supply amount. The magnitude of the value is indicative of the amount of supply or exhaust desired. In alternative embodiments, the ride height adjustment may be more complex, based on additional inputs, and may convey additional information.

Figure 12:
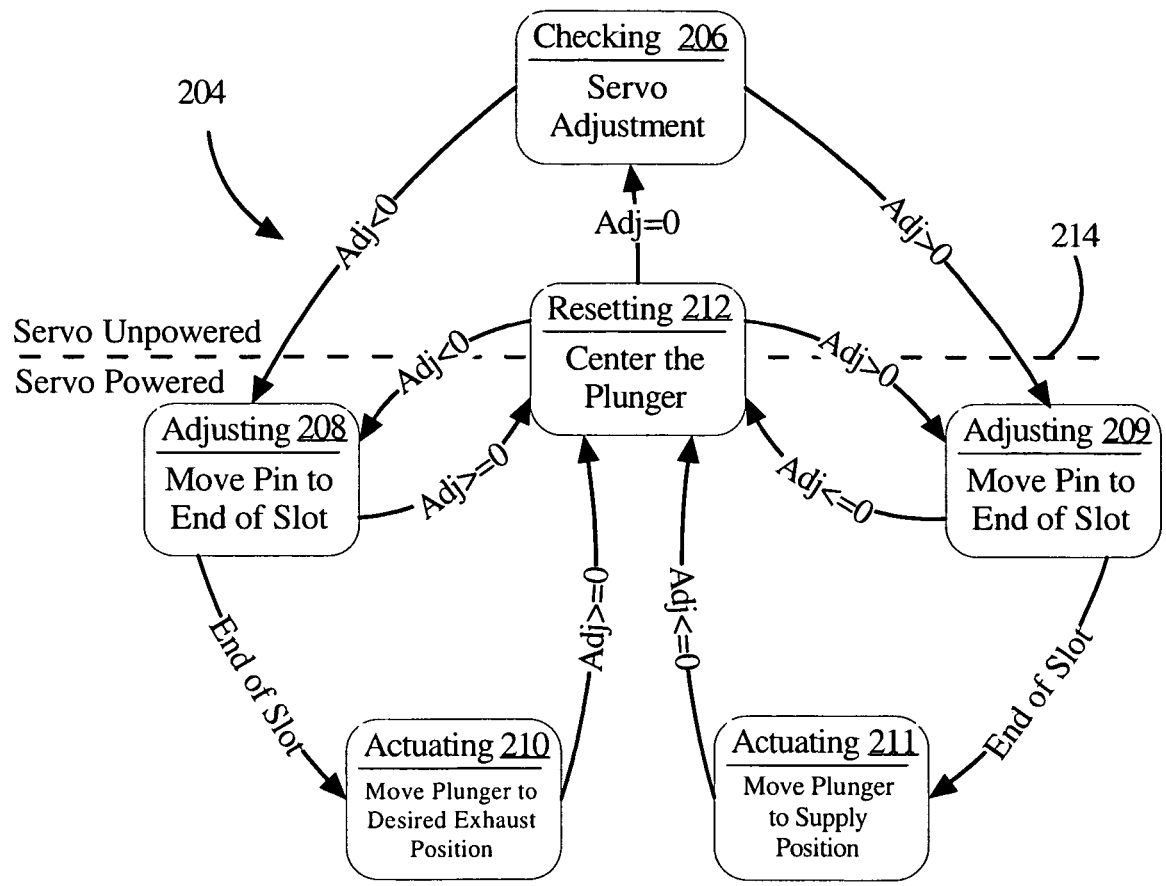
FIG. 12 is a state diagram showing one embodiment of determining a servo command.

With reference to the state diagram of FIG. 12, one embodiment of the process for determining a servo command will now briefly be described. In general, the process 204 includes the following steps: periodically checking to see if a ride height adjustment is necessary 206, adjusting the plunger pin to the end of the slot in the exhaust direction 208 or supply direction 209 by actuating the servo until the amount of current being drawn exceeds a pre-determined threshold indicative of reaching the end of slot, actuating the servo to move the plunger to a desired exhaust position 210 or desired supply position 211, and resetting the plunger to a center position once the adjustment is complete 212. This process allows for precise movement of the plunger and ultimately precise ride height adjustments.

Further, because the servo is capable of moving the plunger to precise positions, a wider range of exhaust and supply rates are available. There are a number of benefits to operating at different exhaust and supply rates. For example, the transition from one ride height to another can be made smoothly over a desired time frame or a higher initial rate may be employed followed up by a lower rate as the adjustment nears completion. Accordingly, adjusting the supply or exhaust rate can allow even more precise ride height control.

The servo need not be powered when there is no adjustment to be made, as indicated by the dashed line 214 in FIG. 12. Often, ride height is adjusted to a desired level and maintains that ride height for some time making ride height control unnecessary a majority of the time. Accordingly, in the current embodiment, the servo is configured such that once an adjustment is made, the plunger is centered and the servo is powered down. In one embodiment, resetting the servo 212 may be performed without servo power by relying on plunger spring 82 and exhaust spring 83 to self center the plunger. Keeping the servo unpowered when possible provides power savings and results in less wear on the servo.

In the current embodiment, servo adjustments need not be discrete. That is, while the plunger is being moved to a particular exhaust or supply position that position may change and the process can account for that change. For example, if a ride height adjustment of 22 mm is desired at the outset, but during operation the adjustment is updated to 35 mm, the system need not center the plunger before completing the adjustment to 35 mm. Where the adjustment goes from requiring a supply position to an exhaust position (or vice versa), the plunger may be reset immediately and need not complete the adjustment. In this way, the plunger can be quickly moved in the opposite direction to account for the adjustment in the opposite direction.

The above descriptions are those of the preferred embodiments of the invention. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The embodiments of the invention in which an exclusive property or privilege is claimed are defined as follows:

1. A height control valve for a height control system of a vehicle, the vehicle including at least two members separated by a distance, the height control valve comprising:
 a valve assembly including:
  a valve body defining a bore in fluid communication with a supply port, an exhaust port and a suspension port, and
  a valve plunger movable within the bore toward at least one of a supply position in which air of the supply port is directed to the suspension port, an exhaust position in which air of the suspension port is directed to the exhaust port, and a closed position in which the suspension port is closed to prevent air from flowing therethrough; and a control unit joined with the valve assembly, the control unit including:

a housing, an actuator responsive to a change in the distance between the at least two members, the actuator including a first magnetic element, the actuator movably joined with the housing, a second magnetic element positioned adjacent, but not contacting, the first magnetic element, at least one of the first magnetic element and second magnetic element adapted to generate a position signal indicative of the change in the distance between the at least two members, a servo located in the housing, the servo joined with a linkage that moves the valve plunger, the servo being energized with a servo current to move the linkage, the servo current undergoing a change when the linkage begins to move the valve plunger, and a controller that processes the position signal and actuates the servo to move the valve plunger toward the at least one of the supply position, the exhaust position and the closed position, wherein the controller senses the change in the servo current when the linkage begins to move the valve plunger and establishes a selected movement of the valve plunger so that the valve plunger is positioned at a desired position relative to the at least one of the supply position, the exhaust position and the closed position.

2. The valve of claim 1 wherein the linkage includes a linkage element and the valve plunger defines a slot having a slot end, the linkage element being journaled in the slot, wherein the servo current undergoes the change when the linkage element engages the slot end.

3. The valve of claim 1 wherein the linkage defines a slot having a slot end, and the valve plunger includes a linkage element, the linkage element being journaled in the slot, wherein the servo current undergoes the change when the slot end engages the linkage element.

4. The valve of claim 1 wherein the servo includes an arm and a rotation axis, the arm adapted to rotate about the axis, the arm being joined with a pivot element to the linkage.

5. The valve of claim 1 wherein the first magnetic element is a magnetic body and the second magnetic element is a magnetic position sensor in electrical communication with the controller.

6. The valve of claim 1 wherein the first magnetic element is a magnetic position sensor in electrical communication with the controller, and the second magnetic element is a magnetic body.

7. The valve of claim 1 wherein the actuator is a control arm rotatably joined with the housing, wherein the actuator rotates in response to the change in the distance between the at least two members so that the first magnetic element moves relative to the second magnetic element.

8. A height control valve for a vehicle having a first member and a second member that moves relative to the first member and at least one air spring, the valve comprising:

an actuator joined with the first member;

a housing joined with the second member;

a sensor joined with the housing, the sensor generating a position signal indicative of movement of the first member relative to the second member;

a servo joined with the housing, the servo powered by a servo current;

a valve assembly including a plunger, the plunger operably joined with and moveable by the servo, the plunger adapted to move, and to control the flow of fluid to and from the vehicle air spring; and a controller that receives the position signal and that detects a change in the servo current, and that actuates the servo to move the plunger a selected distance in response to the change in the servo current.

9. The height control valve of claim 8 wherein the sensor includes a first sensing element joined with the actuator and a second sensing element joined with the housing, the first sensing element and the second sensing element proximal one another but not contacting one another.

10. The height control valve of claim 8 comprising a servo linkage connecting the servo and the plunger.

11. The height control valve of claim 10 wherein the servo linkage includes a slot and a pin journaled in the slot, the slot having a slot end, wherein engagement of the pin with the slot end produces the change in the servo current.

12. The height control valve of claim 11 wherein the controller detects the change in the servo current, and determines the selected distance to move the plunger in response to the change in the servo current.

13. The height control valve of claim 8 wherein the servo includes an arm that rotates about an axis and a servo linkage, the servo linkage being joined with the plunger.

14. The height control valve of claim 13 wherein the servo linkage moves a first distance relative to the plunger before the servo linkage begins to move the plunger.

15. The height control valve of claim 8 wherein the valve assembly defines a bore, the valve plunger movable within the bore toward at least one of a supply position in which air is directed to the air spring, an exhaust position in which air is exhausted from the air spring, and a closed position in which air is prevented from flowing to and from the air spring.

16. A height control valve comprising:

a valve assembly defining a bore;

a plunger moveably positioned in the bore;

a servo joined with the plunger and adapted to move the plunger within the bore to a plurality of positions, the servo being powered by a servo current, the servo including a linkage, the servo current changing upon the linkage engaging the plunger;

a controller in communication with the servo, the controller adapted to sense a change in the servo current, to determine a selected distance for movement of the plunger and to actuate the servo to move the plunger the selected distance.

17. The height control valve of claim 16 comprising an actuator and a housing, the actuator and the housing moving relative to one another.

18. The height control valve of claim 17 comprising a first sensing element joined with the actuator and a second sensing element joined with the housing, the first sensing element and the second sensing element proximal one another but not contacting one another.

19. The height control valve of claim 18 wherein at least one of the first sensing element and the second sensing element providing a position signal to the controller.

20. The height control valve of claim 16 comprising a sensor that senses the movement of the actuator and provides a position signal to the controller, the controller adapted to process the position signal and the change in the servo current to calculate the selected distance.

21. A height control valve for a vehicle having a first member and a second member that moves relative to the first member and at least one air spring, the valve comprising:

an actuator joined with the first member;

a housing joined with the second member;

a sensor joined with the housing, the sensor generating a position signal indicative of movement of the first member relative to the second member;

a servo joined with the housing, the servo powered by a servo current;

a valve assembly including a plunger and a biasing element, the plunger being operably joined with and moveable by the servo to an exhaust position wherein fluid flows from the vehicle air spring, and a supply position wherein fluid flows to the vehicle air spring; and the biasing element urging the plunger toward a neutral position at which air is neither exhausted nor supplied to the air spring;

a controller that receives the position signal and that actuates the servo to move the plunger a selected distance in response to the position signal, wherein the biasing element moves the plunger toward the neutral position when the servo current at least one of reduces and terminates.

22. The height control valve of claim 21 wherein the servo current is reduced and the servo enters a low power state in response to reaching the selected position.

23. The height control valve of claim 21 wherein the plunger includes a flange and the biasing element includes a pair of opposing springs that engage the flange to urge the plunger toward the neutral position.

24. The height control valve of claim 23 wherein one spring applies force to center the plunger toward the neutral position in response to the servo moving the plunger to an exhaust position, and the other spring applies force to center the plunger toward the neutral position in response to the servo moving the plunger to a supply position.

* * * * *